(12) United States Patent
Condron et al.

(10) Patent No.: US 11,140,301 B2
(45) Date of Patent: Oct. 5, 2021

(54) VEHICULAR CAMERA WITH LENS/COVER CLEANING FEATURE

(71) Applicant: Magna Mirrors of America, Inc., Holland, MI (US)

(72) Inventors: Timothy W. Condron, Canton, MI (US); Anthony J. LaCross, Hastings, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/800,357

(22) Filed: Feb. 25, 2020

(65) Prior Publication Data

US 2020/0275004 A1    Aug. 27, 2020

Related U.S. Application Data

(60) Provisional application No. 62/810,430, filed on Feb. 26, 2019.

(51) Int. Cl.
| | |
|---|---|
| *H04N 5/225* | (2006.01) |
| *H04N 5/232* | (2006.01) |
| *B08B 3/02* | (2006.01) |
| *B08B 5/02* | (2006.01) |
| *B60S 1/56* | (2006.01) |

(Continued)

(52) U.S. Cl.
CPC ........... *H04N 5/22521* (2018.08); *B08B 3/02* (2013.01); *B08B 5/02* (2013.01); *B60R 1/00* (2013.01); *B60S 1/54* (2013.01); *B60S 1/56* (2013.01); *B60S 1/566* (2013.01); *H04N 5/2252* (2013.01); *H04N 5/2253* (2013.01); *H04N 5/23218* (2018.08); *B60R 2300/102* (2013.01); *B60R 2300/105* (2013.01); *B60R 2300/70* (2013.01); *B60R 2300/8066* (2013.01); *B60S 1/481* (2013.01)

(58) Field of Classification Search
None
See application file for complete search history.

(56) References Cited

U.S. PATENT DOCUMENTS

| | | | |
|---|---|---|---|
| 4,157,161 | A | 6/1979 | Bauer |
| 4,967,437 | A | 11/1990 | Morse |

(Continued)

FOREIGN PATENT DOCUMENTS

| | | | |
|---|---|---|---|
| AU | 9515074 A | * | 10/1996 |
| DE | 102011102773 A1 | | 6/2012 |

(Continued)

*Primary Examiner* — Mohammed Jebari
(74) *Attorney, Agent, or Firm* — Honigman LLP

(57) ABSTRACT

A vehicular camera module configured for mounting at an exterior portion of a vehicle includes a housing, a camera disposed in the housing, and a transparent cover rotatably mounted at the housing. The camera views through the transparent cover. With the vehicular camera module mounted at the exterior portion of the vehicle, the camera views through the transparent cover in order to capture image data of a scene exterior of the vehicle. With the vehicular camera module mounted at the exterior portion of the vehicle, the transparent cover rotates relative to the camera and the housing at a rotational speed of at least 1,000 rotations per minute to at least partially remove water and/or debris from an outer surface of the transparent cover.

16 Claims, 15 Drawing Sheets

(51) Int. Cl.
   *B60S 1/54* (2006.01)
   *B60R 1/00* (2006.01)
   *B60S 1/48* (2006.01)

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,886,738 | A * | 3/1999 | Hollenbeck ...... G08B 13/19619 |
| | | | 340/936 |
| 5,949,331 | A | 9/1999 | Schofield et al. |
| 6,554,210 | B2 | 4/2003 | Holt et al. |
| 6,719,215 | B2 | 4/2004 | Drouillard |
| 6,944,908 | B2 | 9/2005 | Hoetzer et al. |
| 7,014,131 | B2 | 3/2006 | Beming et al. |
| 7,267,290 | B2 | 9/2007 | Gopalan et al. |
| 7,480,149 | B2 | 1/2009 | DeWard et al. |
| 7,532,233 | B2 | 5/2009 | Chu |
| 7,627,235 | B2 | 12/2009 | McCutchen et al. |
| 7,965,336 | B2 | 6/2011 | Bingle et al. |
| 8,542,451 | B2 | 9/2013 | Lu et al. |
| 8,567,963 | B1 | 10/2013 | Criscuolo et al. |
| 8,671,504 | B2 | 3/2014 | Ono et al. |
| 9,319,637 | B2 | 4/2016 | Lu et al. |
| 9,327,689 | B2 | 5/2016 | Kikuta et al. |
| 9,604,601 | B2 | 3/2017 | Hsiao et al. |
| 9,645,392 | B2 | 5/2017 | Yoshimura |
| 9,707,896 | B2 | 7/2017 | Boegel et al. |
| 10,589,726 | B1 * | 3/2020 | Ingram ................ G01S 7/4813 |
| 2003/0090569 | A1 | 5/2003 | Poechmueller |
| 2004/0189831 | A1 | 9/2004 | Shibatani et al. |
| 2007/0132610 | A1 | 6/2007 | Guernalec et al. |
| 2007/0273971 | A1 | 11/2007 | Waldmann et al. |
| 2008/0179482 | A1 * | 7/2008 | van Amelsfoort ...... F16L 39/04 |
| | | | 248/349.1 |
| 2009/0244361 | A1 | 10/2009 | Gebauer et al. |
| 2009/0250533 | A1 | 10/2009 | Akiyama et al. |
| 2011/0073142 | A1 | 3/2011 | Hattori et al. |
| 2011/0181725 | A1 * | 7/2011 | Matsuura ............... G03B 17/02 |
| | | | 348/148 |
| 2011/0266375 | A1 | 11/2011 | Ono et al. |
| 2011/0292212 | A1 | 12/2011 | Tanabe et al. |
| 2012/0117745 | A1 | 5/2012 | Hattori et al. |
| 2012/0243093 | A1 | 9/2012 | Tonar et al. |
| 2013/0092758 | A1 | 4/2013 | Tanaka et al. |
| 2013/0094086 | A1 | 4/2013 | Bochenek |
| 2013/0146577 | A1 | 6/2013 | Haig et al. |
| 2013/0209079 | A1 * | 8/2013 | Alexander ............. B60R 11/04 |
| | | | 396/25 |
| 2013/0255023 | A1 | 10/2013 | Kikuta et al. |
| 2013/0300869 | A1 | 11/2013 | Lu et al. |
| 2013/0319486 | A1 | 12/2013 | Kikuta et al. |
| 2014/0060582 | A1 | 3/2014 | Hartranft et al. |
| 2014/0104426 | A1 | 4/2014 | Boegel et al. |
| 2014/0232869 | A1 | 8/2014 | May et al. |
| 2015/0138357 | A1 | 5/2015 | Romack et al. |
| 2015/0183404 | A1 | 7/2015 | Romack et al. |
| 2015/0277111 | A1 | 10/2015 | Bell et al. |
| 2015/0321621 | A1 | 11/2015 | Van Dan Elzen et al. |
| 2015/0327398 | A1 | 11/2015 | Achenbach et al. |
| 2015/0344001 | A1 | 12/2015 | Lopez Galera et al. |
| 2015/0353024 | A1 | 12/2015 | Cooper |
| 2016/0103316 | A1 | 4/2016 | Rousseau |
| 2016/0264064 | A1 | 9/2016 | Byrne et al. |
| 2016/0272163 | A1 | 9/2016 | Dreiocker et al. |
| 2017/0036647 | A1 | 2/2017 | Zhao et al. |
| 2017/0349147 | A1 * | 12/2017 | Blank ....................... B60S 1/56 |
| 2018/0207691 | A1 | 7/2018 | Byrne et al. |
| 2019/0041234 | A1 * | 2/2019 | Ghannam ................ B60S 1/56 |
| 2019/0299938 | A1 | 10/2019 | Deegan |
| 2020/0114877 | A1 * | 4/2020 | Hu ..................... G02B 27/0006 |
| 2020/0254979 | A1 * | 8/2020 | Bretagnol ............. B60S 1/0848 |

FOREIGN PATENT DOCUMENTS

| | | | |
|---|---|---|---|
| EP | 2353940 A1 | 8/2011 | |
| EP | 2949521 A1 | 12/2015 | |
| JP | 06178175 A * | 6/1994 | ......... G02B 27/0006 |
| JP | 2007053448 A | 3/2007 | |
| JP | 2017513772 A | 6/2017 | |
| KR | 20070034729 A | 3/2007 | |
| WO | 2012138455 A1 | 10/2012 | |

* cited by examiner

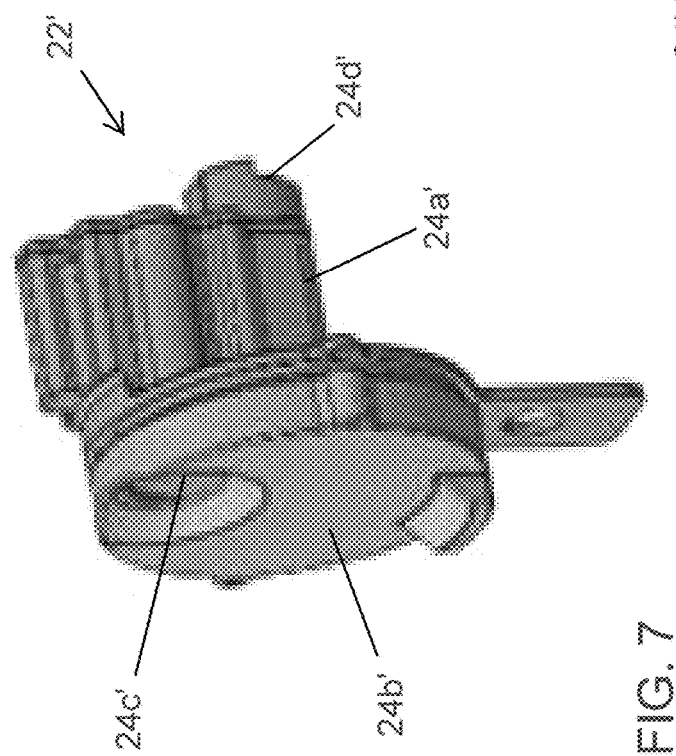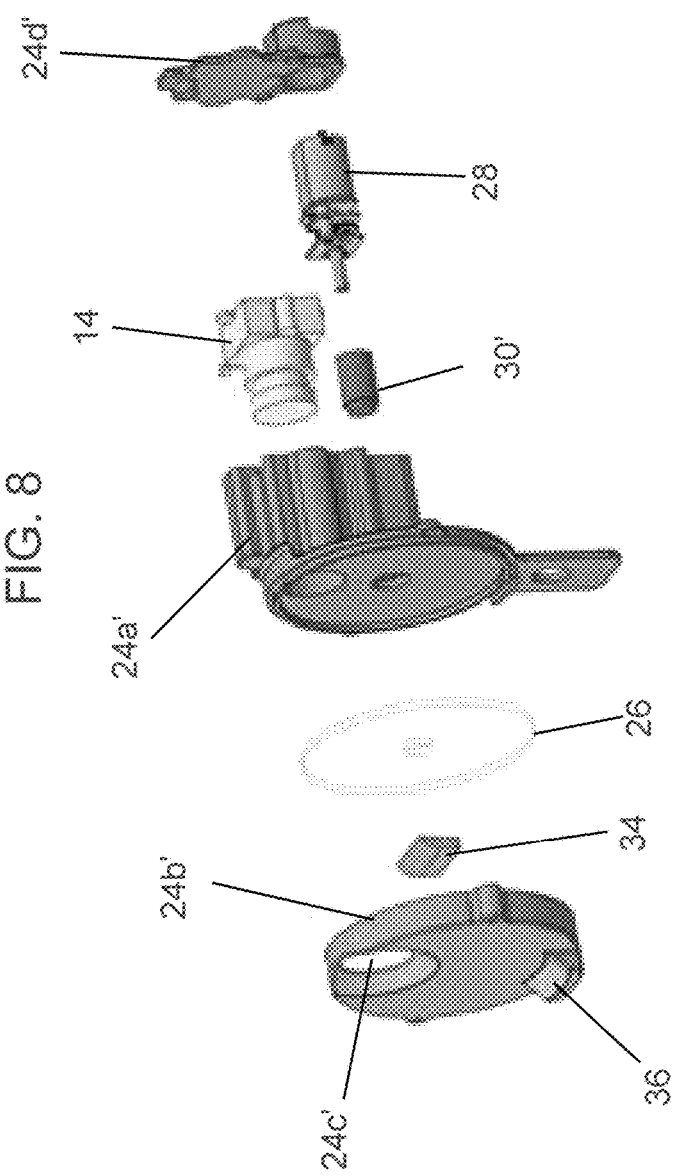

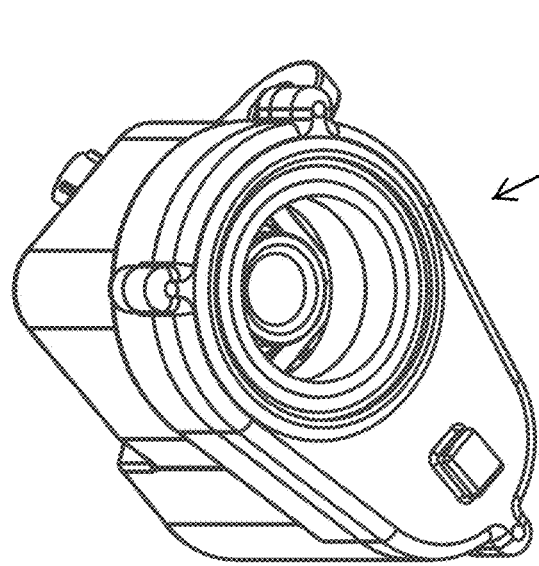
FIG. 13
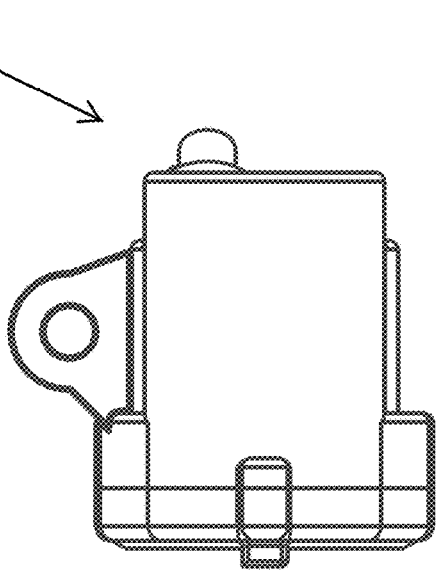
FIG. 15
FIG. 14
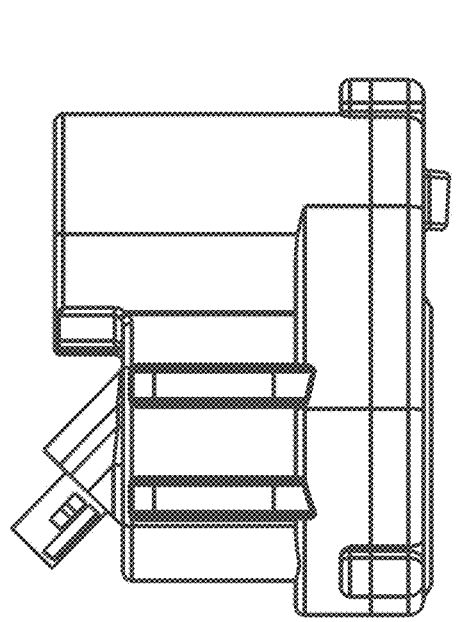
FIG. 16
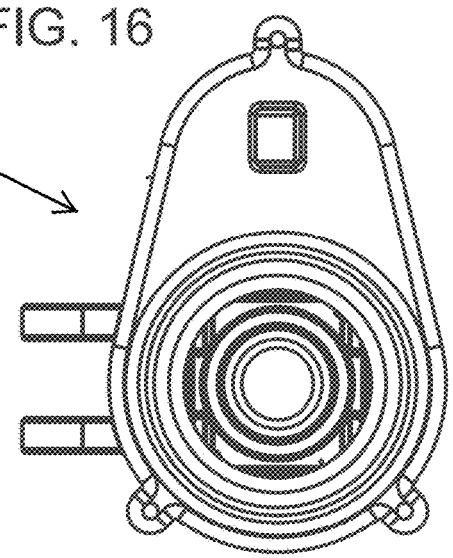

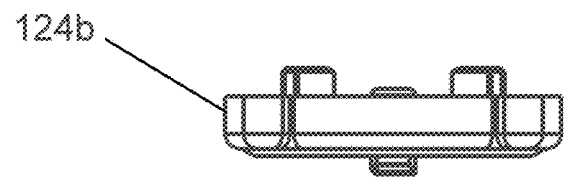
FIG. 28
FIG. 29
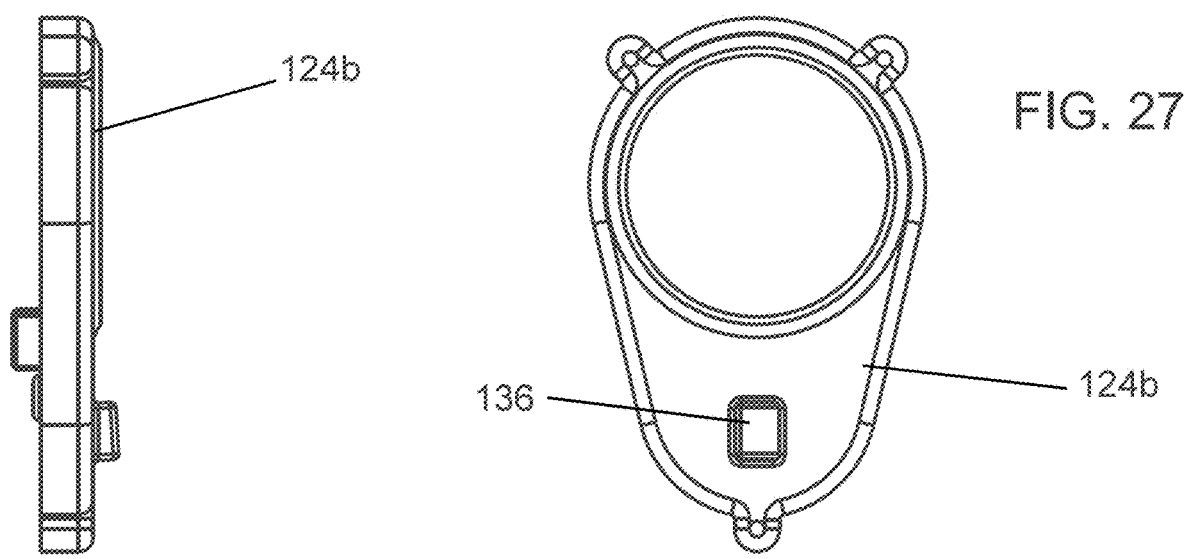
FIG. 27

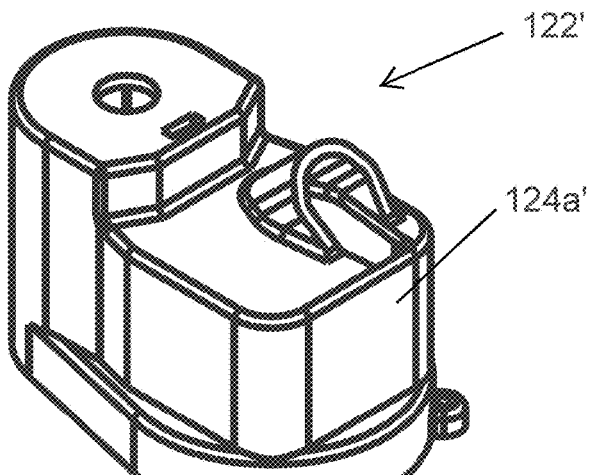
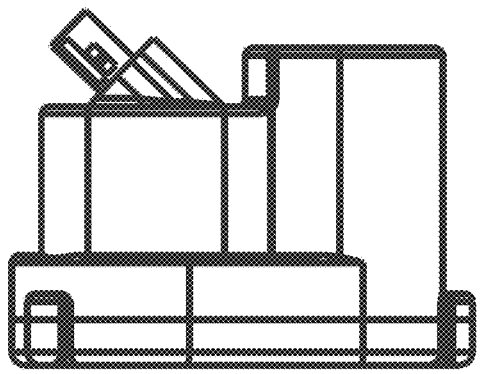
FIG. 33
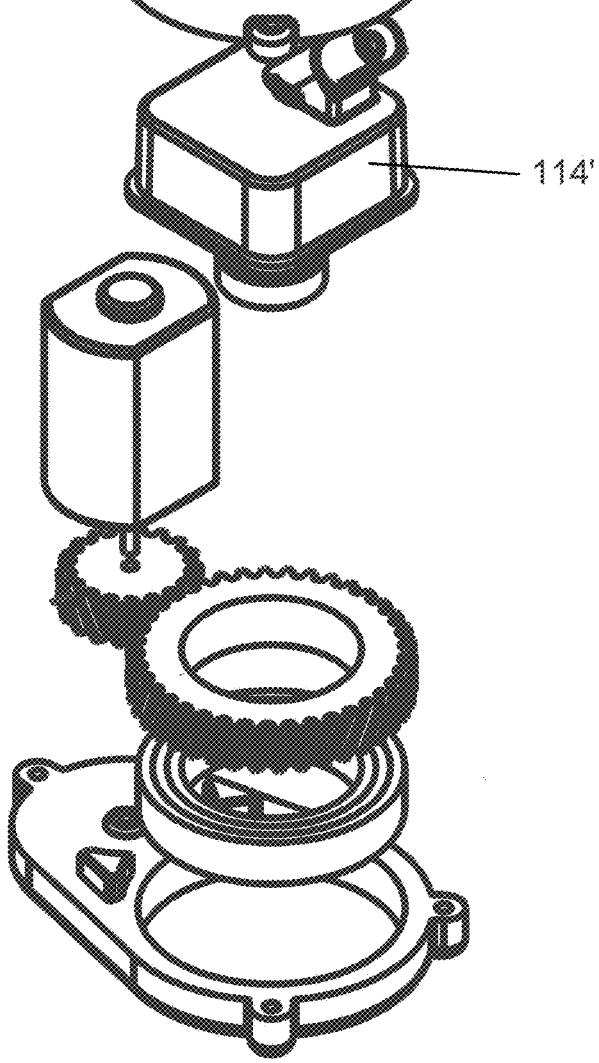
FIG. 32
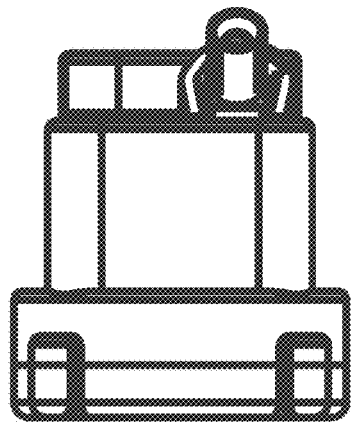
FIG. 34
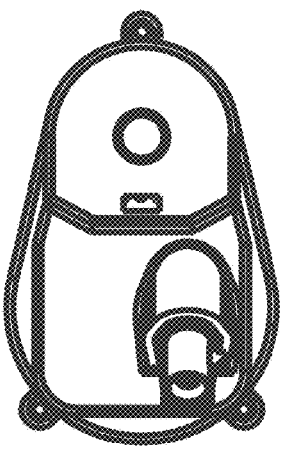
FIG. 35

VEHICULAR CAMERA WITH LENS/COVER CLEANING FEATURE

CROSS REFERENCE TO RELATED APPLICATION

The present application claims the filing benefits of U.S. provisional application Ser. No. 62/810,430, filed Feb. 26, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. It is known to provide a cleaning system that cleans debris from the lens or cover of the camera, such as described in U.S. Publication Nos. US-2016-0272163; US-2016-0264064 and US-2014-0104426, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a lens/cover cleaner that rotates or spins a transparent cover at high RPMs (such as greater than 1,000 revolutions per minute) to remove water and debris from the cover so that the camera (disposed behind and viewing through the cover) has a clear field of view through the cover and exterior of the vehicle.

These and other objects, advantages, purposes and features of the present invention will become apparent upon review of the following specification in conjunction with the drawings.

BRIEF DESCRIPTION OF THE DRAWINGS

FIG. 7 is a perspective view of another camera module in accordance with the present invention;

FIG. 8 is an exploded perspective view of the camera module of FIG. 7;

FIGS. 11-20 are views of the camera module of FIG. 9;

FIGS. 27-29 are views of the outer housing portion of the camera module, with a spraying element disposed thereat;

FIG. 32 is a perspective view of another camera module in accordance with the present invention;

FIGS. 33-35 are views of the camera module of FIG. 32;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
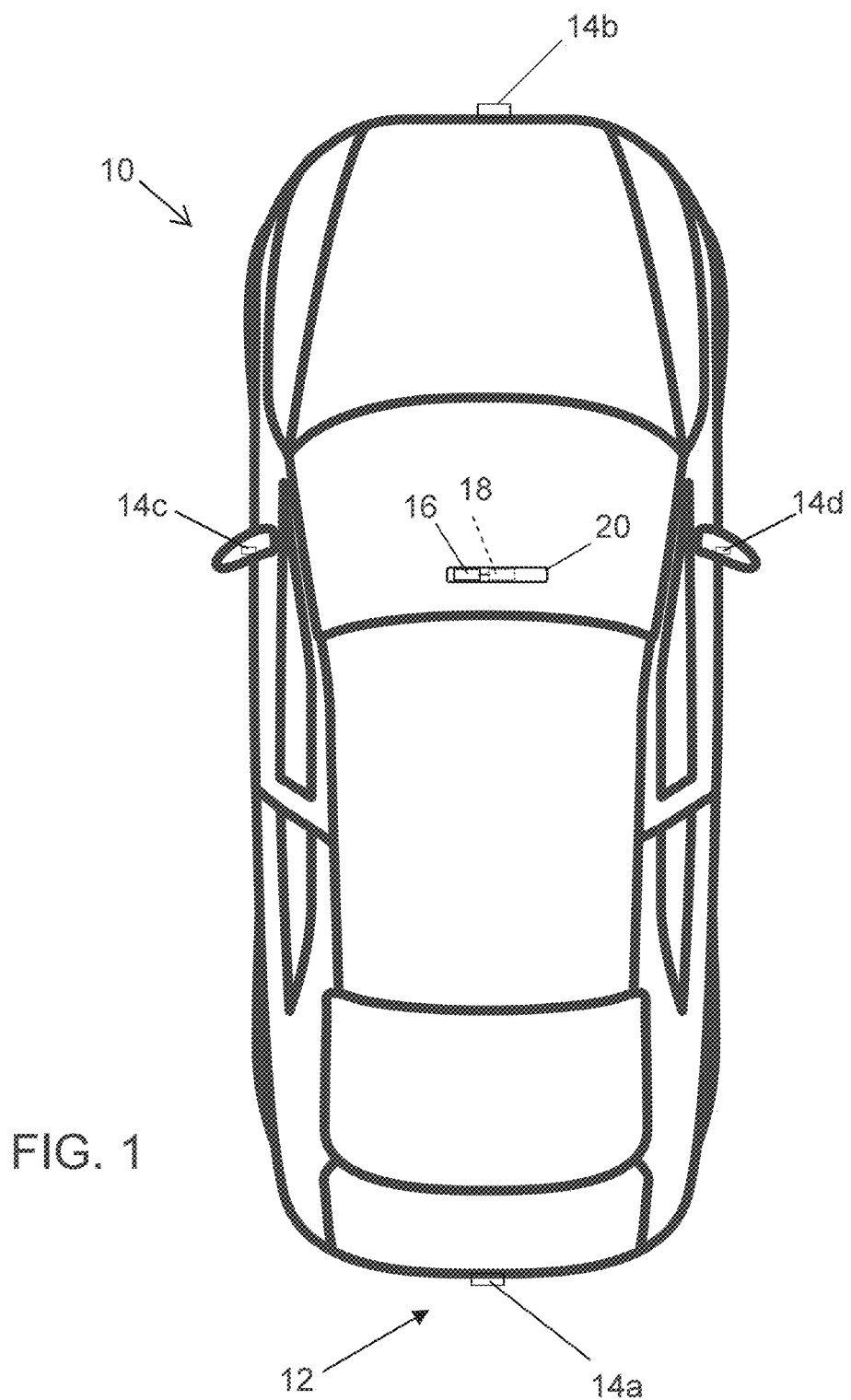
FIG. 1 is a plan view of a vehicle with a vision system that incorporates cameras in accordance with the present invention.
Figure 2:
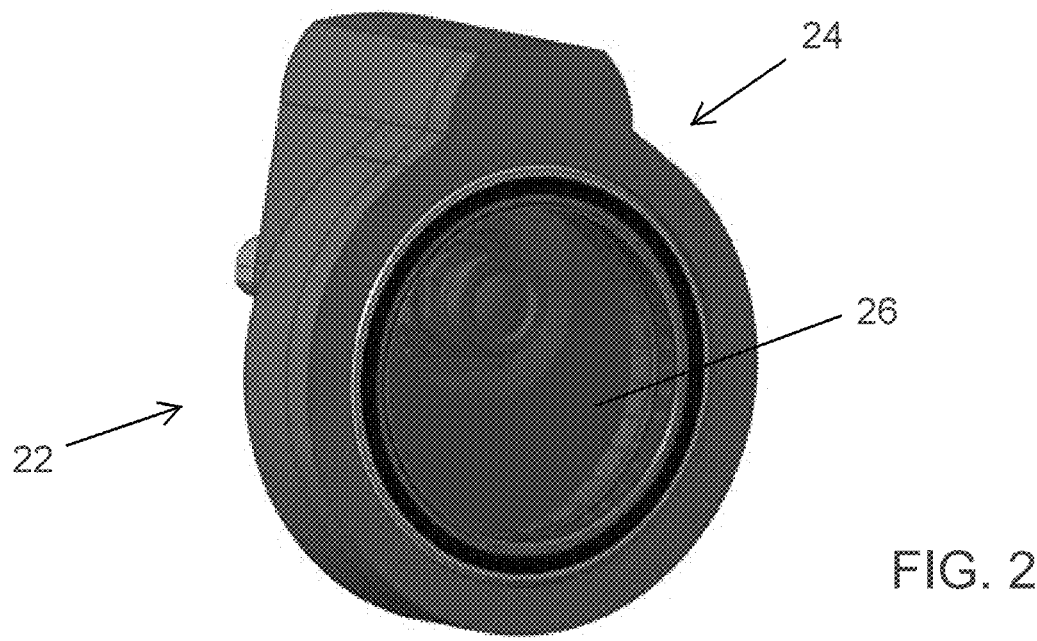
FIG. 2 is a perspective view of a camera module having a rotating transparent cover in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

As shown in FIGS. 2-6, an exterior camera module 22 is configured to be fixedly mounted at an exterior portion of the vehicle so as to have an exterior field of view. The module 22 includes a housing 24 and a clear lens or cover 26 (such as a transparent glass disk) that is disposed in front of the lens of the camera 14. The housing includes a rear housing portion 24a and a front or outer housing portion 24b that combine or cooperate to house the camera 14 in a housing cavity. A motor 28 and gear assembly 30 are disposed at and in the housing 22, whereby operation of the motor 28 rotatably drives an output gear 30a, which in turn rotatably drives a bearing gear 30b to rotate the cover 26 at a bearing 32 at the outer housing portion 24b, as discussed below.

Figure 3:
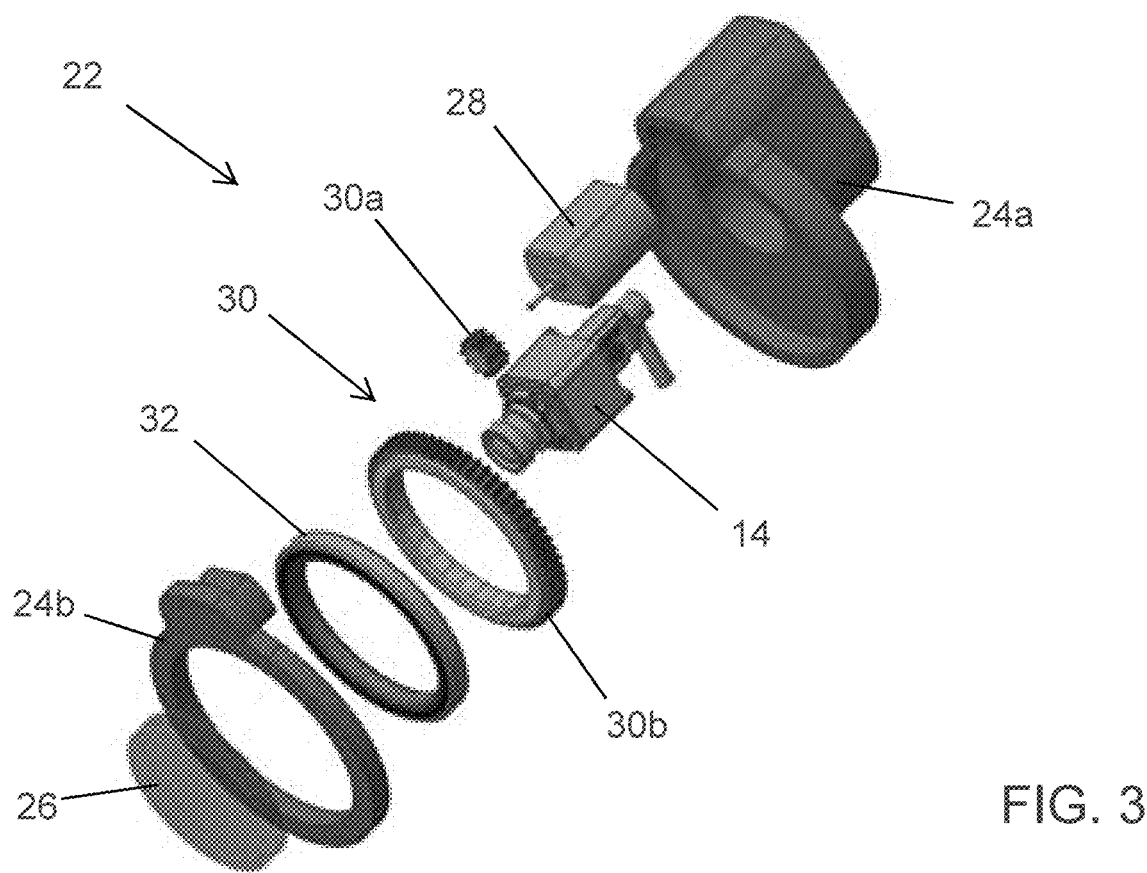
FIG. 3 is an exploded perspective view of the camera module of FIG. 2.
Figure 5:
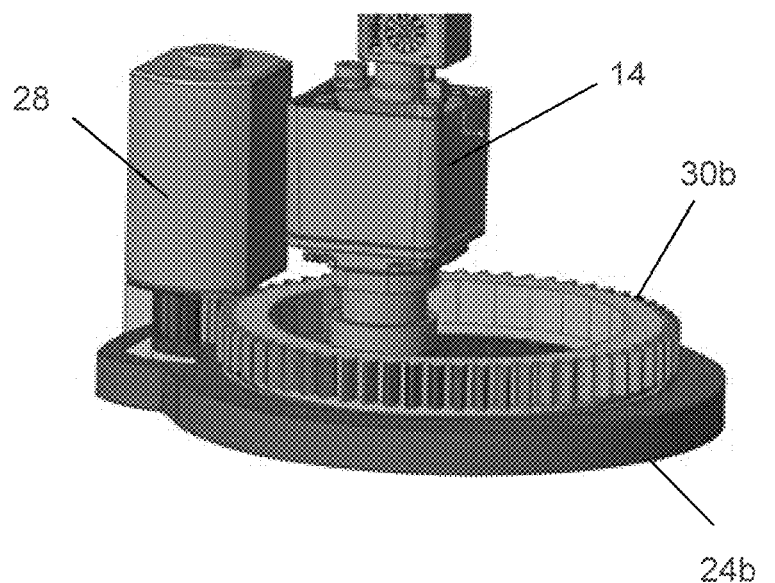
FIG. 5 is another perspective view of the camera module of FIG. 2, with the housing removed to show additional details.
Figure 4:
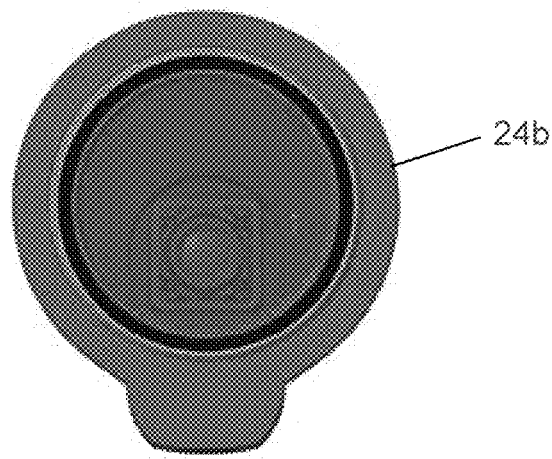
FIG. 4 is a plan view of the camera module of FIG. 2.

In the illustrated embodiment, and such as shown in FIG. 3, the housing comprises a cavity for receiving the camera therein such that the lens of the camera is offset from a center region of a larger diameter receiving portion that receives the bearing gear and bearing and cover thereat. Thus, the camera views through (and has its principal axis of its field of view at) the transparent cover radially outward from a center region of the cover (see FIGS. 4 and 5), such that, when the cover is spun or rotated at high RPMs (via operation of the motor), the area that the camera views through is spun clear via centrifugal forces at the outer surface of the cover. The motor operates to spin the transparent cover or disk at speeds greater than 1,000 RPMs, preferably greater than 5,000 RPMs, and optionally greater than 10,000 RPMs (such as, for example, around 11,000 RPMs). The camera is disposed so the camera lens is close enough to the transparent cover (such as a clear glass disk) so that the field of view of the camera is not adversely affected by smaller particles or scratches or imperfections at the cover.

Figure 6:
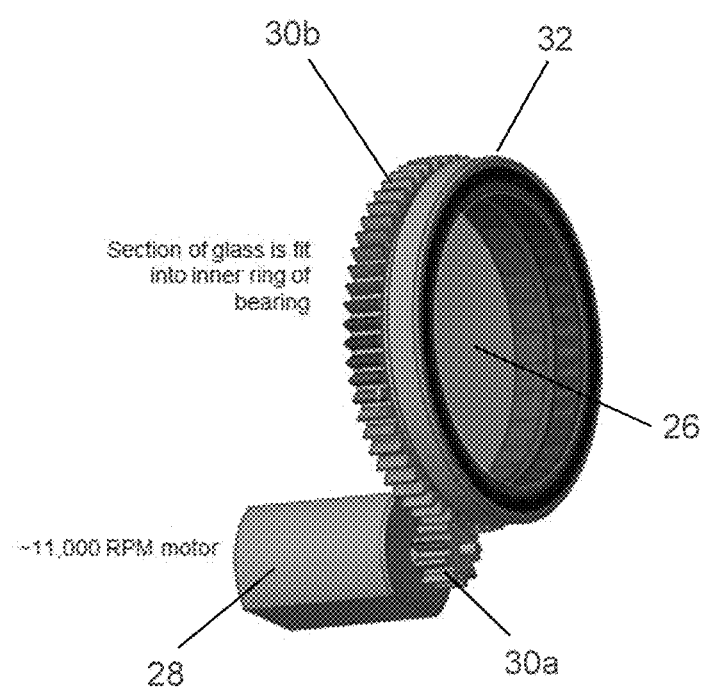
FIG. 6 is a perspective view of the motor and gears and cover element of the camera module.
Figure 9:
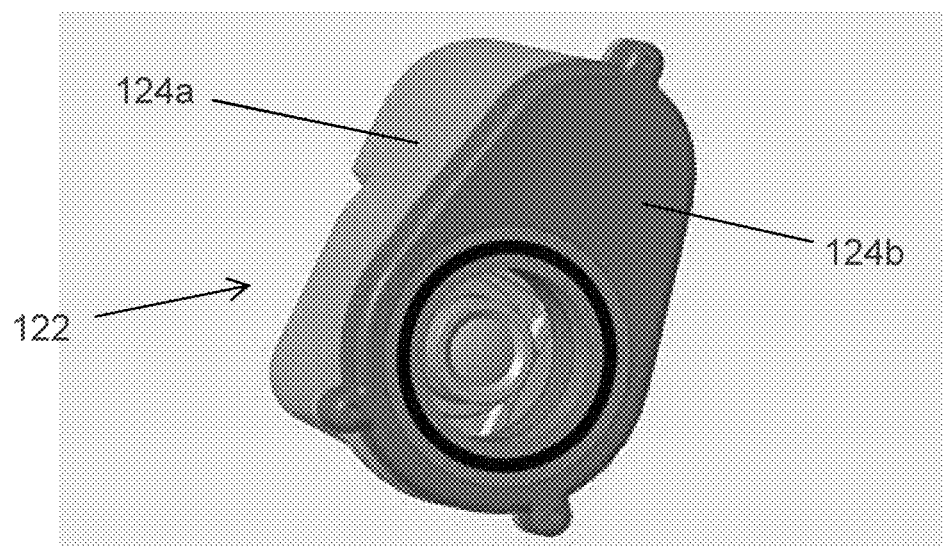
FIG. 9 is a perspective view of another camera module having a rotating transparent cover in accordance with the present invention.
Figure 10:
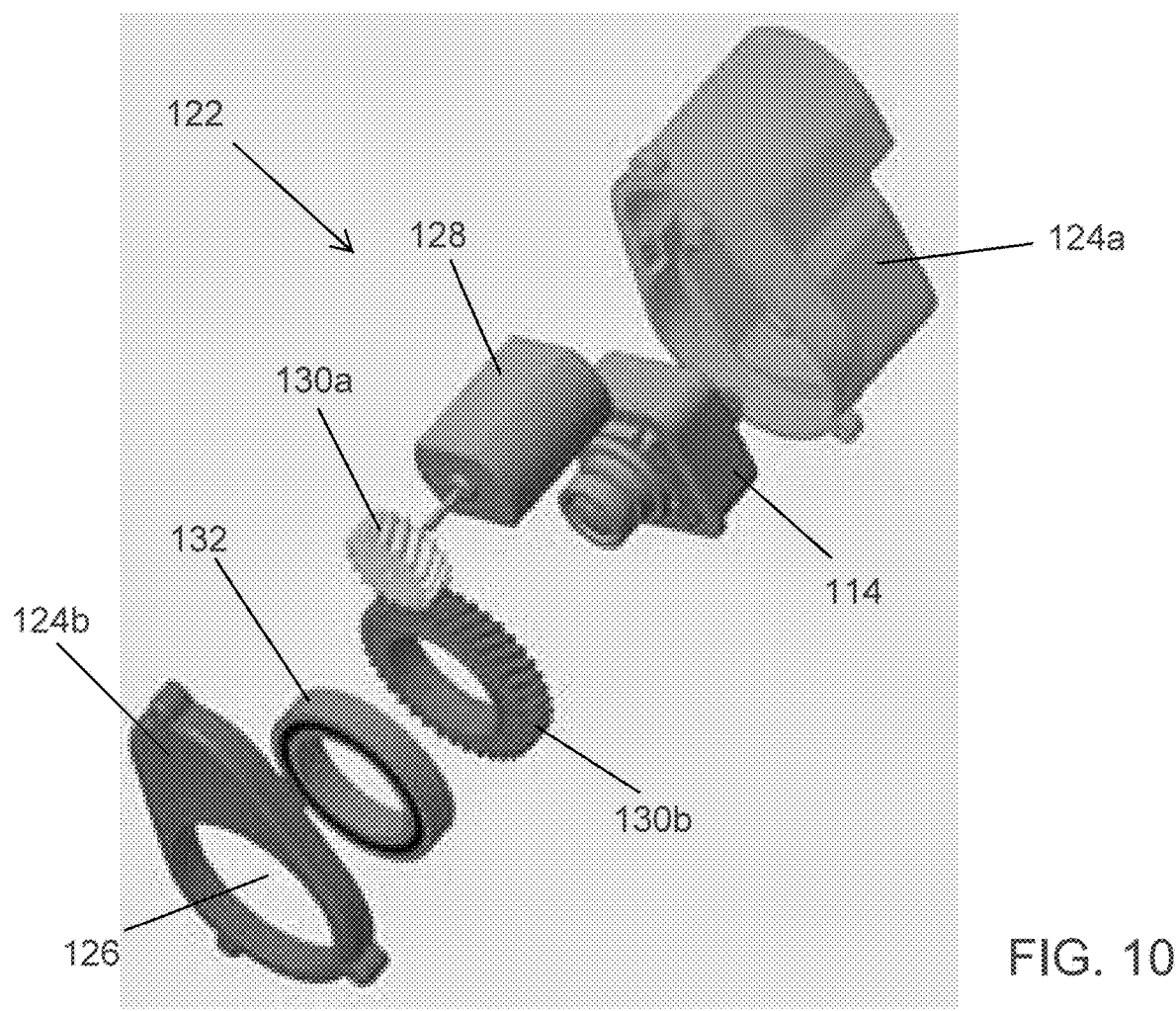
FIG. 10 is an exploded perspective view of the camera module of FIG. 9.
Figure 11:
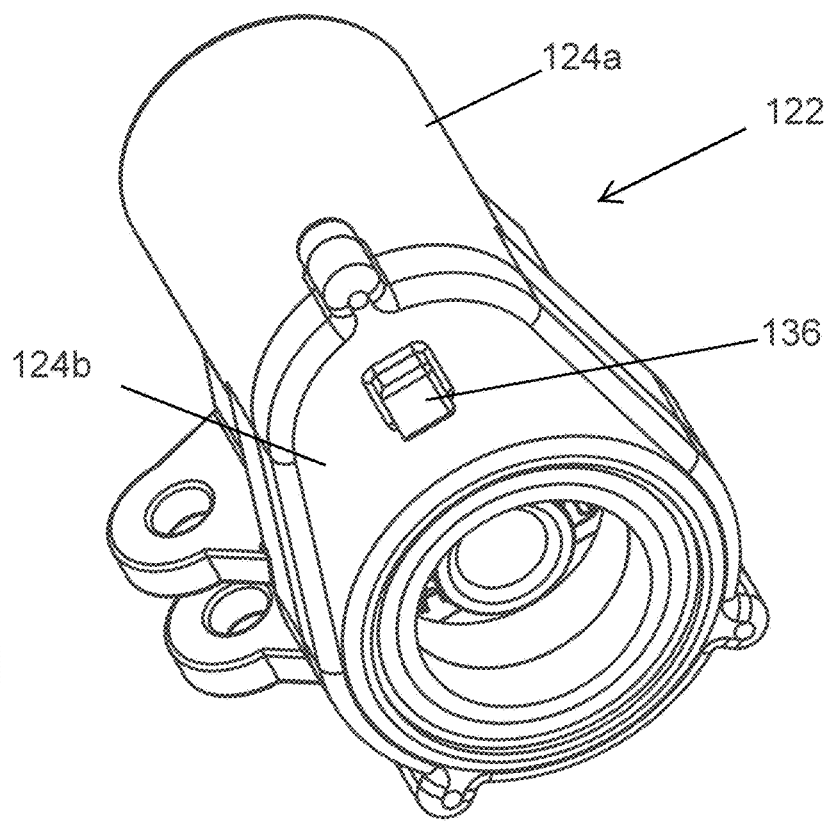
Figure 12:
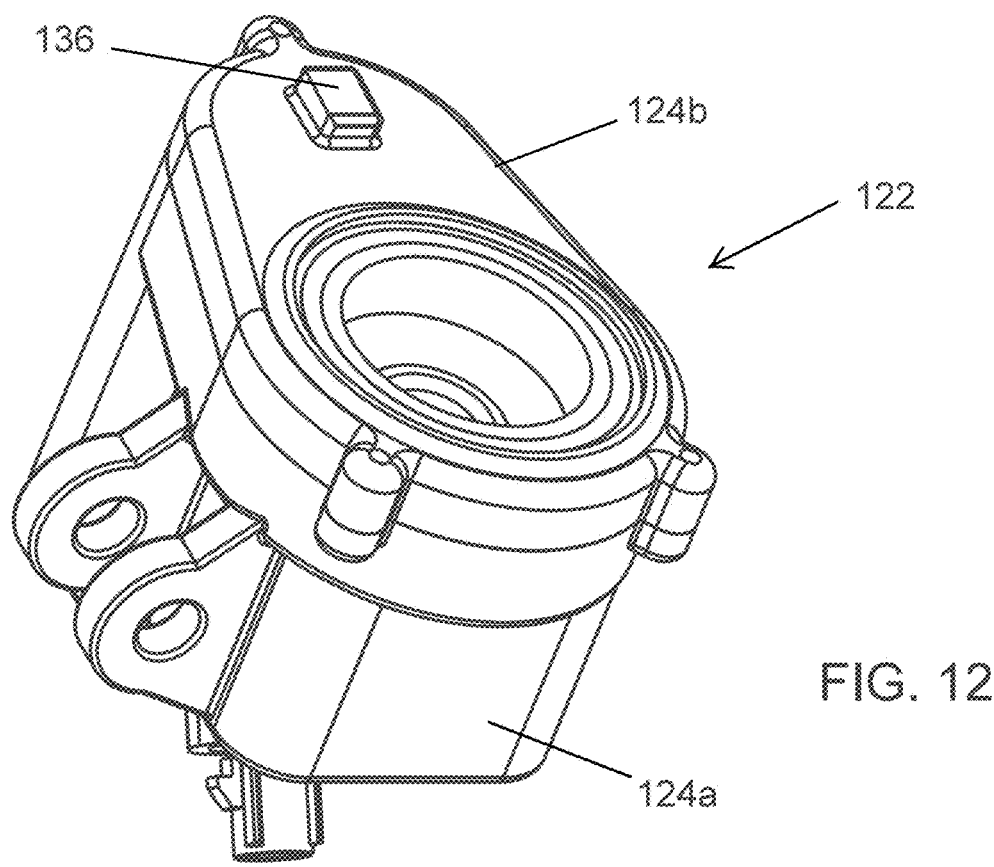
Figure 17:
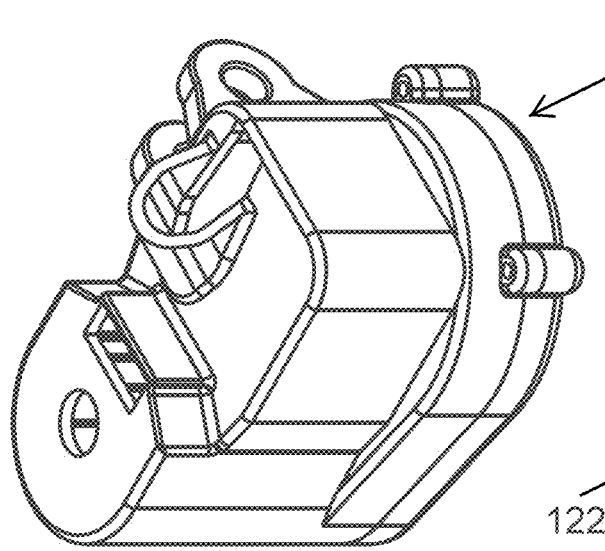
Figure 18:
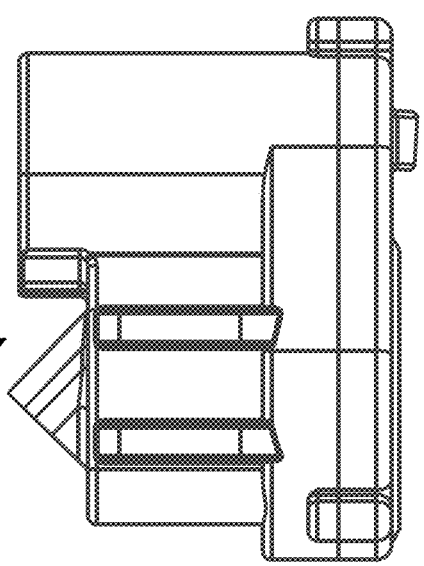
Figure 19:
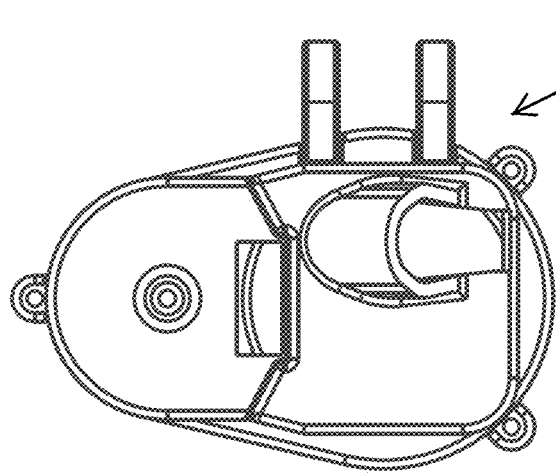
Figure 20:
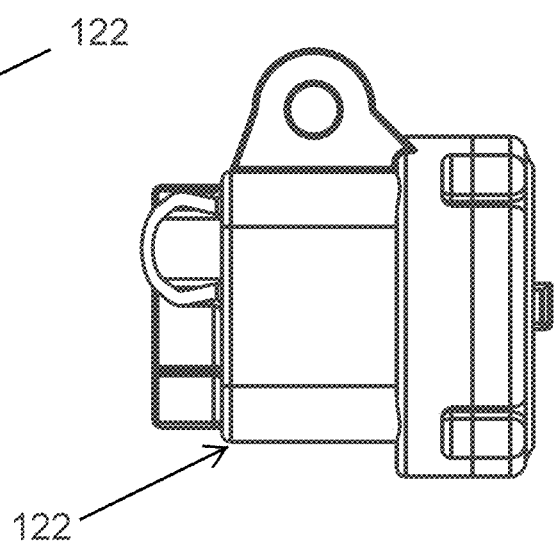
Figure 21:
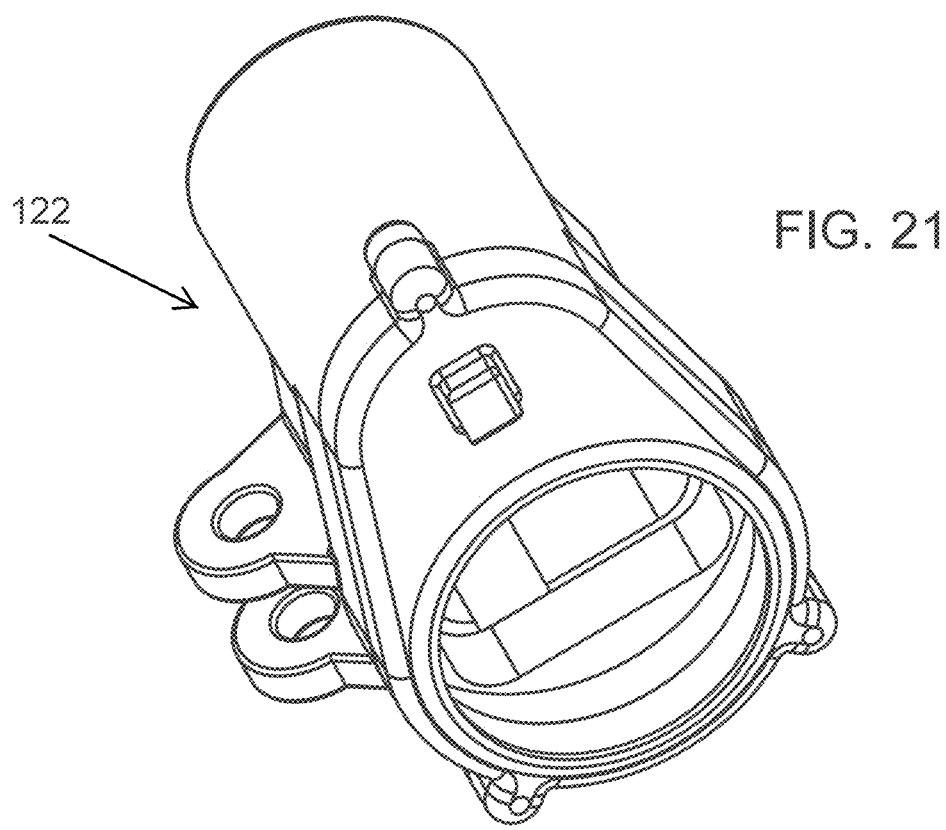
FIGS. 21-26 are views of the housing of the camera module of FIG. 9.
Figure 22:
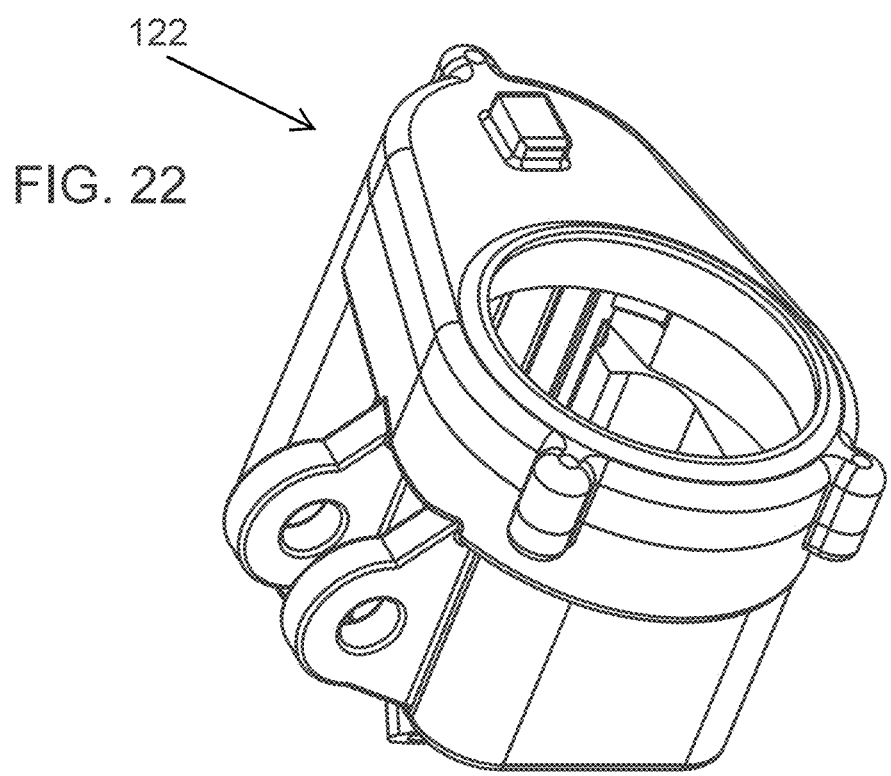
Figure 23:
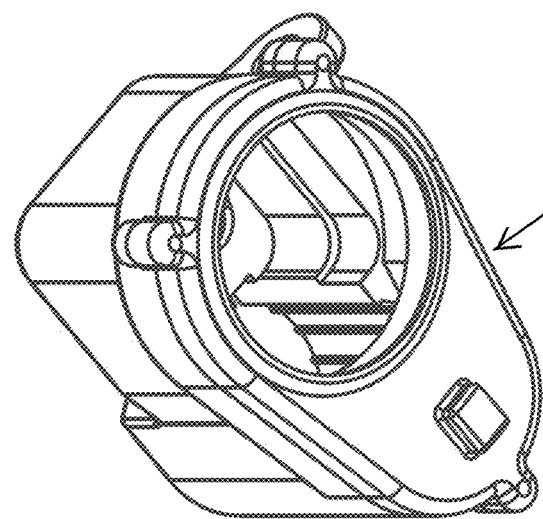
Figure 24:
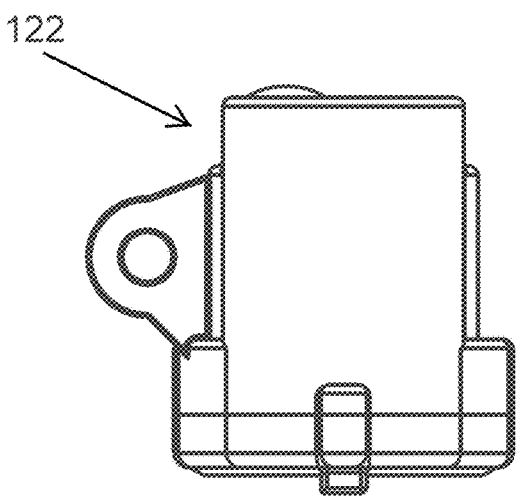
Figure 26:
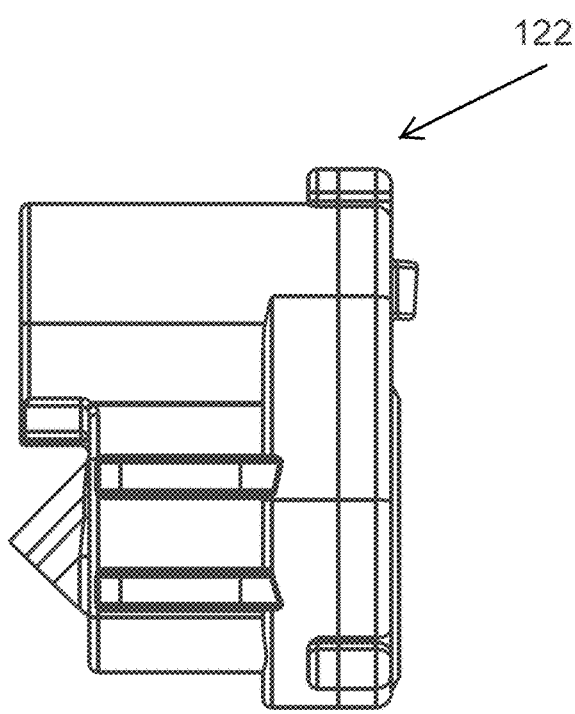
Figure 25:
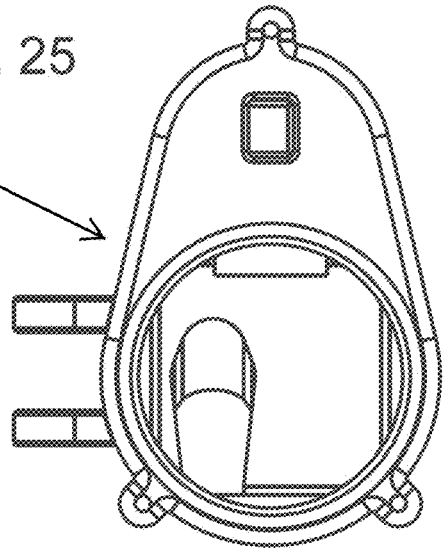
Figure 30:
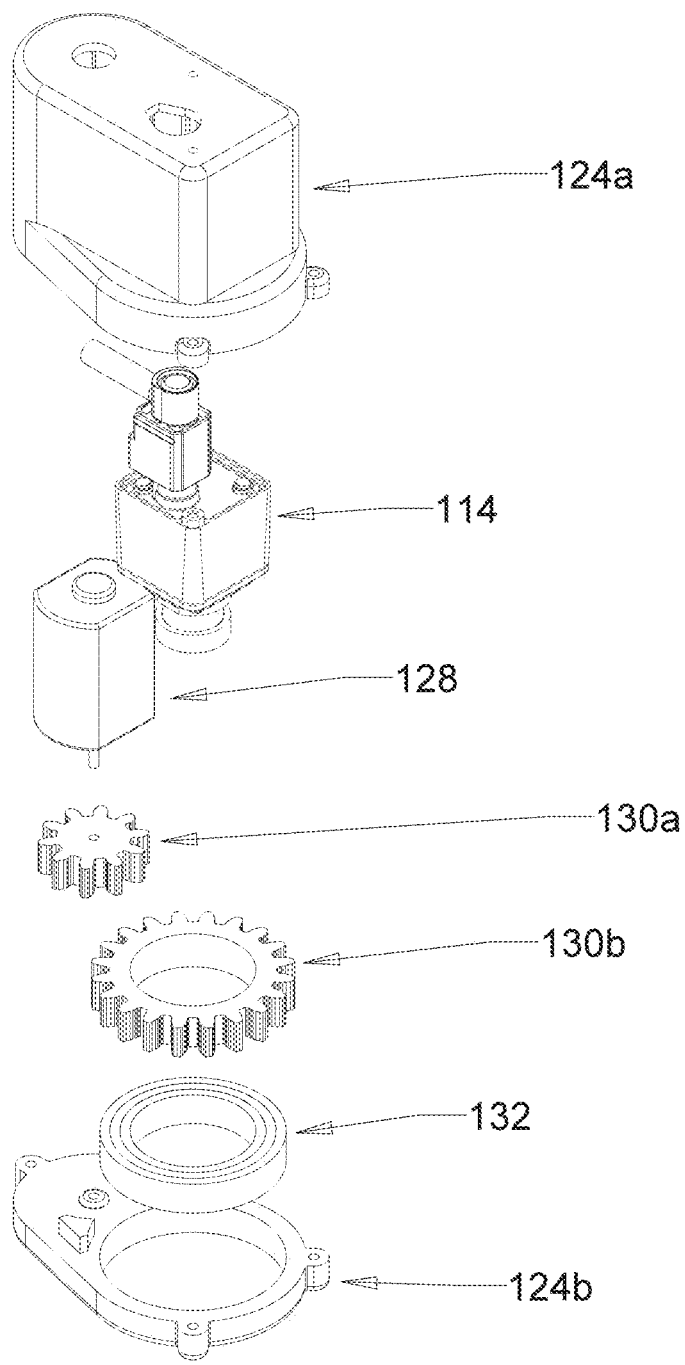
FIG. 30 is another exploded perspective view of the camera module.
Figure 31:
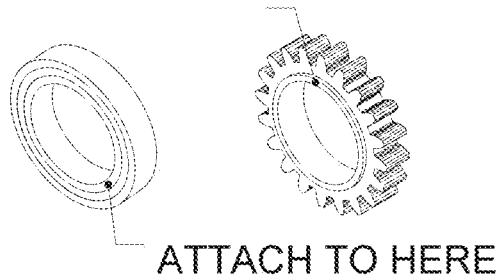
FIG. 31 is an exploded perspective view of the gear and bearing assembly.
Figure 36:
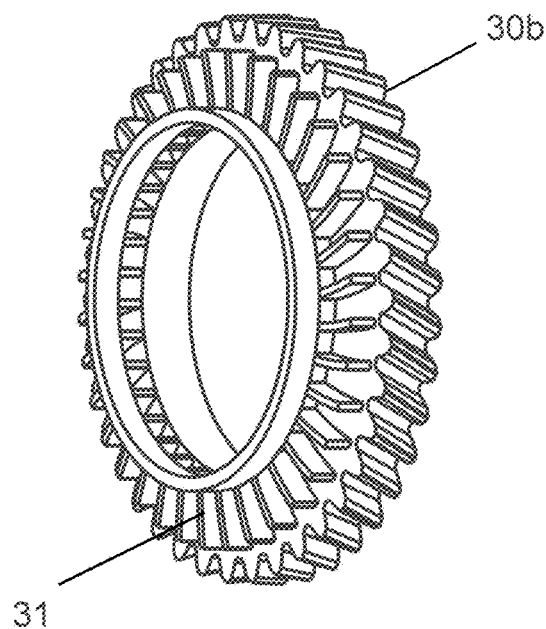
FIGS. 36-39 are views of a gear element of the camera module, shown with fins at its inner side to provide air flow at the camera lens.

As shown in FIG. 6, the cover is disposed at the inner bearing ring, which is attached to the bearing gear, such as via adhesive or the like. The outer bearing ring may be press fit into the outer housing and/or adhesively bonded at the outer housing, whereby rotational driving of the bearing gear rotatably drives the inner bearing ring and rotates the cover relative to the outer bearing ring and the housing of the camera module.

The camera module motor operates (when actuated or energized or electrically powered) to spin the cover or disk fast enough to accelerate water/debris off of the cover. Optionally, the cover may be coated with a hydrophobic coating so that water readily flows radially outward and off of the cover when the cover is rotated or spun. The motor and gear assembly and cover require low torque to operate and can keep the camera cover continuously clear of water, and there is a low risk in debris causing the motor to stall. The camera module provides a reduced size profile and packaging area as compared to separate spray nozzles and wiping systems.

Figure 37:
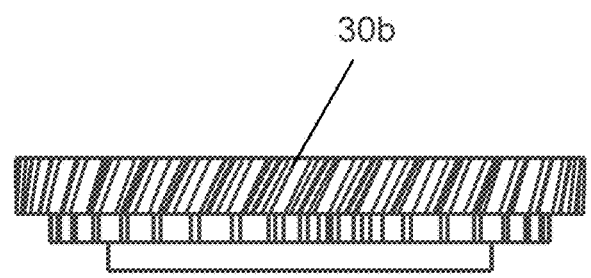
Figure 39:
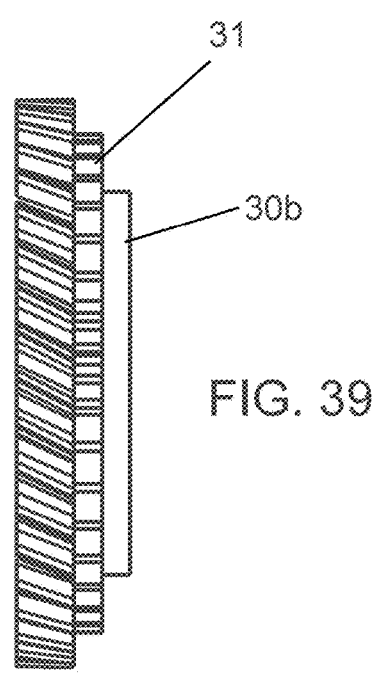
Figure 38:
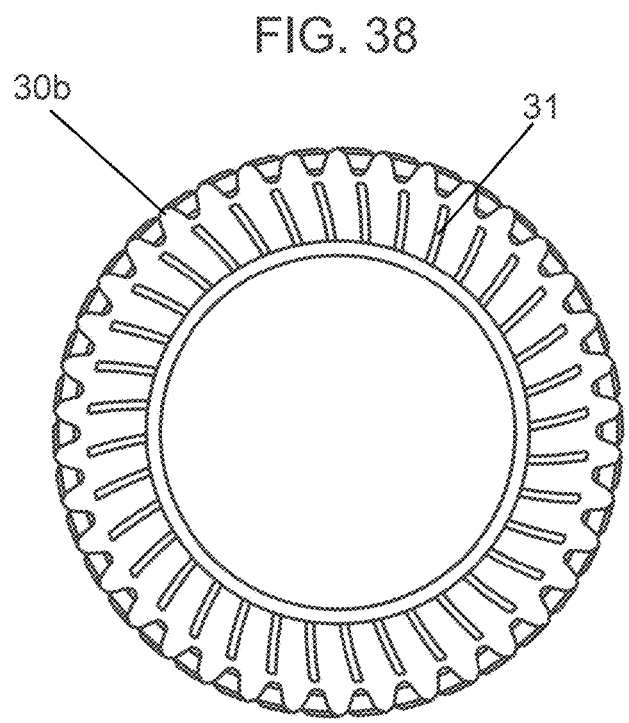

Optionally, in order to reduce fog at the cover, the camera module may comprise a sealed module and may optionally be filled with an inert gas. Optionally, a heater pad or element (that may operate on the same electrical line or circuit as an exterior mirror heater pad) may be provided to maintain a desired temperature range of the camera module and cover. Optionally, and such as shown in FIGS. 37-39, the bearing gear 30b may comprise a plurality of fins 31 disposed at its surface to enhance airflow in the camera module to reduce or avoid fogging of the cover and of the camera lens.

Optionally, and such as shown in FIGS. 7 and 8, a camera module 22' may have the transparent cover 26 disposed within the outer housing portion 24b', with the outer housing portion 24b' having an aperture 24c' that is aligned with an aperture at the inner or rear housing portion 24a' at which the camera 14 and camera lens are disposed. The camera module 14' includes a rear housing cover 24d' that is attached at the rear of the rear housing portion 24a' after the camera 14 and motor 28 and output gear 30' are disposed in the rear housing portion 24a'. The motor 28 operates to rotatably drive the gear 30', which engages a center part of the cover 26 to spin or rotate the cover within the housing. Optionally, the camera module may include a wiping element 34 in the housing to wipe the exterior surface of the cover as it is rotated. Optionally, the camera module may include a fluid spray element 36 that sprays pressurized fluid (e.g., air or water or other gas or liquid) across the exposed part of the cover 26 at the aperture 24d'. The spray device may spray pressurized air and/or water onto and across the cover to remove debris thereat.

Another camera module 122 (shown in FIGS. 9-31) includes a housing 124 and a clear lens or cover 126 (such as a transparent glass disk) that is disposed in front of the lens of the camera 114. The housing includes a rear housing portion 124a and a front or outer housing portion 124b that house the camera 114 therein. A motor 128 and gear assembly are disposed at and in the housing, whereby operation of the motor 128 rotatably drives an output gear 130a, which in turn rotatably drives a bearing gear 130b to rotate the cover 126 at a bearing 132 at the outer housing portion 124b, such as in a similar manner as discussed above. The gears 130a, 130b comprise helical gears so the module can operate with less noise. The gears may provide a 2:1 gearing ratio or a 19:9 gearing ratio or more or less, depending on the particular application of the camera module. Optionally, the camera module 122 may include a fluid spraying device or element 136, which is operable to spray pressurized fluid onto the outer surface of the cover 126 as the cover is spun or rotated by the motor 128. The spraying device may protrude from the outer cover portion 124b and may direct the pressurized fluid across and onto the outer surface of the cover 126. The spray device may spray pressurized air and/or fluid onto and across the cover to remove debris thereat. The camera module 122 may be otherwise similar to the camera modules 22, 22', such that a detailed discussion of the camera modules need not be repeated herein.

FIGS. 32-35 illustrate another camera module 122', which is similar to camera module 122, but has an angled electrical connector of the camera 114' protruding through an aperture at the rear of the rear housing portion 124a' for electrical connection of the camera to a wire harness of the vehicle. Electrical power to the motor of the camera modules may be provided via the same wire harness connection or via a separate electrical connection to the motor. The camera module 122' may be otherwise similar to the camera modules 22, 22', 122, such that a detailed discussion of the camera modules need not be repeated herein.

Thus, the camera module, when disposed at the vehicle, may have the cover located at or flush with the outer surface of the vehicle where the camera is installed. When rain hits the cover, the system may (via processing of image data captured by the camera) detect obstructions in the field of view of the camera, whereby the motor is actuated to rotate the cover to spin the rain off of the cover. The motor may continue to spin the cover until the system determines that the rain has stopped hitting the cover.

If some debris remains at the cover after spinning, the system may utilize a supplementary wiper element to wipe the cover or may utilize a supplementary fluid spray device to spray fluid onto the cover to loosen the debris.

Thus, when the clear cover is rotated or spun relative to the fixedly mounted or non-moving camera, water or debris present at the cover is spun off of the cover to clear the field of view of the camera through the cover. Optionally, the camera module may include a wiping element that may wipe a portion of the cover to assist in clearing water and debris from the cover. Optionally, a spraying device or forced air jet device may be provided that sprays washing fluid onto the cover and/or blows air across the cover to assist in clearing water and debris from the cover. Optionally, a heating element may be provided at the cover (such as an electrically conductive trace or coating at the glass cover that heats when an electrical current is applied or such as any other suitable heating means) to heat the cover to assist in melting snow or ice that may be present at the cover. The heating element may be automatically actuated responsive to a temperature sensor sensing an ambient temperature at the vehicle that is below a threshold temperature.

The motor may be actuated responsive to a user input or when rain or snow or precipitation is sensed (such as by a rain sensor of the vehicle) or responsive to image processing of image data captured by the camera (when such image processing determines contaminants present in front of and in the field of view of the camera). Optionally, for a rearward viewing backup assist camera or rear backup camera, the motor may be actuated to rotate or spin the cover element responsive to the vehicle being shifted into a reverse gear so that the cover element is cleaned each time the backup camera is operated.

The camera and rotatable cover element may be part of a camera module that includes a housing or bracket that is mounted at an exterior portion of the vehicle so that the camera is fixed relative to the vehicle and views through an aperture of the exterior portion of the vehicle. The module includes the rotatable cover element rotatably mounted at the housing that attaches to the vehicle. The cover element thus rotatably attaches at the housing, while the camera is fixedly attached at the housing, which fixedly attaches at the vehicle so that the cover of the housing corresponds with or aligns with the aperture of the exterior portion of the vehicle.

Thus, the clear lens or cover may rotate in front of the fixedly mounted or non-moving camera to continuously spin the cover and keep the area in front of the camera lens clear, such as during rain or snow conditions or the like. The camera of the present invention thus provides a means to continuously keep the full video mirror camera area clear of obstruction (such as dirt or debris or other contaminants at or in front of the lens of the camera).

The rotationally cleared outside camera spins the cover glass fast enough to cause contaminants to flow or fall off of it due to the centrifugal forces generated by the spinning disk. If the cover was spinning all the time, the cover should stay clean/clear of obstructions. However, when a vehicle is parked for instance, contaminants may build up and dry on the cover glass. Thus, a water jet/spray may be desirable to enhance the cleaning of the cover.

The system may utilize various combinations of cleaning concepts for different driving scenarios. For example, if driving in the rain, the rotationally cleared outside camera and/or an air knife may be used to keep the water droplets from sitting on the lens or cover glass. This could be activated responsive to activation of the windshield wiper system of the vehicle or responsive to detection of rain by a rain sensor of the vehicle or responsive to dirty-lens-detection algorithms built into the camera or vision system of the vehicle. Upon start-up from a parked or storage situation, the vehicle may automatically activate a cleaning cycle or may activate the cleaning cycle responsive to detection of a dirty or obstructed lens. This may comprise a combination of water spray and air knife or water spray and rotating the cover for a shorter period of time. By combining various cleaning concepts, the lifetime of the moving parts or motors can be extended as they would not necessarily have to be running all of the time. Additionally, the air knife (such as forced or compressed air blown across the lens as a curtain of forced air) not only is used to clear the lens of particulates, but it also can be used to shield the lens from particulates, so that the particulates do not reach or attach to the lens. In other words, compressed air blowing across the lens effectively establishes a barrier that deflects particulates across the lens and away from the lens before the particulates reach the lens.

The rotationally cleared outside camera spins the glass disk to keep camera lens clear. The module may use gears or any other suitable drive means, such as a belt or the like to be able to offset the packaging of the motor. The clearance of the design may vary with the distance of the obstruction from the axis of disk rotation. Debris which is farther out will experience more acceleration while closer in will experience significantly less. The camera may be positioned off-center relative to the cover so that the camera views through a region of the cover that will experience the greater acceleration. However, by mounting the camera close to the lens and on the axis of lens rotation, any obstructions remaining on the center of the disk may not be visible to the camera.

Use of bevel gears can allow the motor to be oriented differently allowing varied packaging configurations. The motor may spin or rotate its drive gear at 1,500 RPMs or more, such as, for example, at 3,000 RPMs.

To prevent icing, an electrical heater may be included to heat the lens or cover. A washer fluid jet may be added to the system to help remove any dried on debris. To help prevent internal fog, the spinning disk may incorporate fins similar to a centrifugal fan to generate airflow over the inner side of the lens. The module may be sealed to prevent water ingress, and possibly filled with an inert gas to reduce or prevent fogging. A hydrophobic material or coating may be utilized to decrease the rotation rate required to remove water. Use of obstruction detection may allow the system to only run when the camera view is obstructed.

To further assist in clearing stuck-on debris, the system may be operable to allow the disk to rotate at a lower rate, while a wipe temporarily contacts the cover to remove the debris. Optionally, for example, the motor RPM may be reduced (and optionally the motor output torque may be increased), and pressurized fluid from the washer fluid jet may cause a wiping element to lock into place through mechanical means so the wiping element wipes the cover element as the cover element is rotated (at the slower speed). After a threshold period of time or threshold number of rotations with the wiping element in contact with the cover element, the wiping element may be moved away from the cover and the motor may return to the higher speed spinning. The motor gear assembly may have different gearing mechanisms or shifting of gears to provide low-torque, high RPM (e.g., greater than 1,000 RPMs or greater than 2,000 RPMs) operation and lower RPM (e.g., less than 500 RPMs or less than 250 RPMs or less than 100 RPMs) and higher torque operation, depending on the particular situation.

The wiping element and motor control may be responsive to detection of dirt or debris or the like at the cover element. For example, responsive to detection (such as via processing of image data captured by the camera) that presence of dirt or ice or debris at the cover element exceeds a threshold amount, a controller may automatically control the motor and cause the motor speed to reduce or slow down (and optionally may increase the drive torque of the motor), and may control the wiping element to move the wiping element into engagement or contact with the cover element. After a period of time operating with the wiping element engaged with the cover element (and with the motor speed at the reduced speed) or responsive to determination that the dirt or ice or debris has been sufficiently removed, the controller may control the wiping element to move the wiping element from engagement with the cover element and to increase the motor speed (and optionally reduce the drive torque) to return the motor to its previous/normal operating speed.

Optionally, the fluid spray device may utilize an ultrasonic/Piezoelectric transducer to create cavitation in the liquid to help in clearing the surface of the cover. Optionally, structural waves may be used to cause shear stress between a material layer and an ice layer and thus may be used to enhance water or ice removal.

Optionally, the washer fluid flow may be used to operate the varied cleaning methods that need rotation. For example, instead of using an electric motor, the pressure of the washer fluid may be used to drive a small hydraulic motor that rotates the lens or transparent cover. After the fluid flows through the hydraulic motor to drive the motor and rotate the transparent cover, the washer fluid may be sprayed onto the camera lens or transparent cover. A similar setup could be used for compressed air applications.

Figure 40:
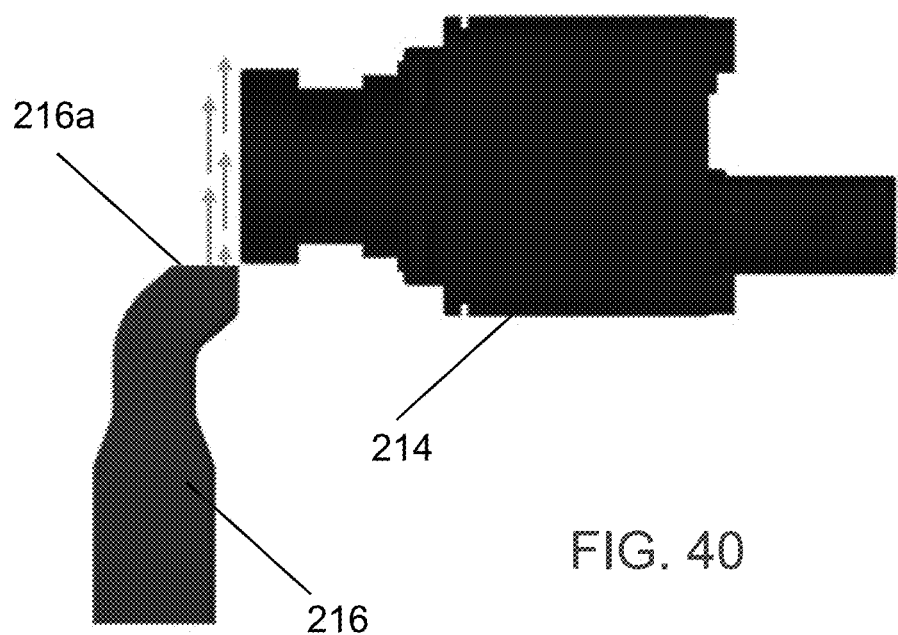
FIGS. 40 and 41 are views of another camera module, with an air jet disposed thereat for directing pressurized air onto and across a lens of the camera module.
Figure 41:
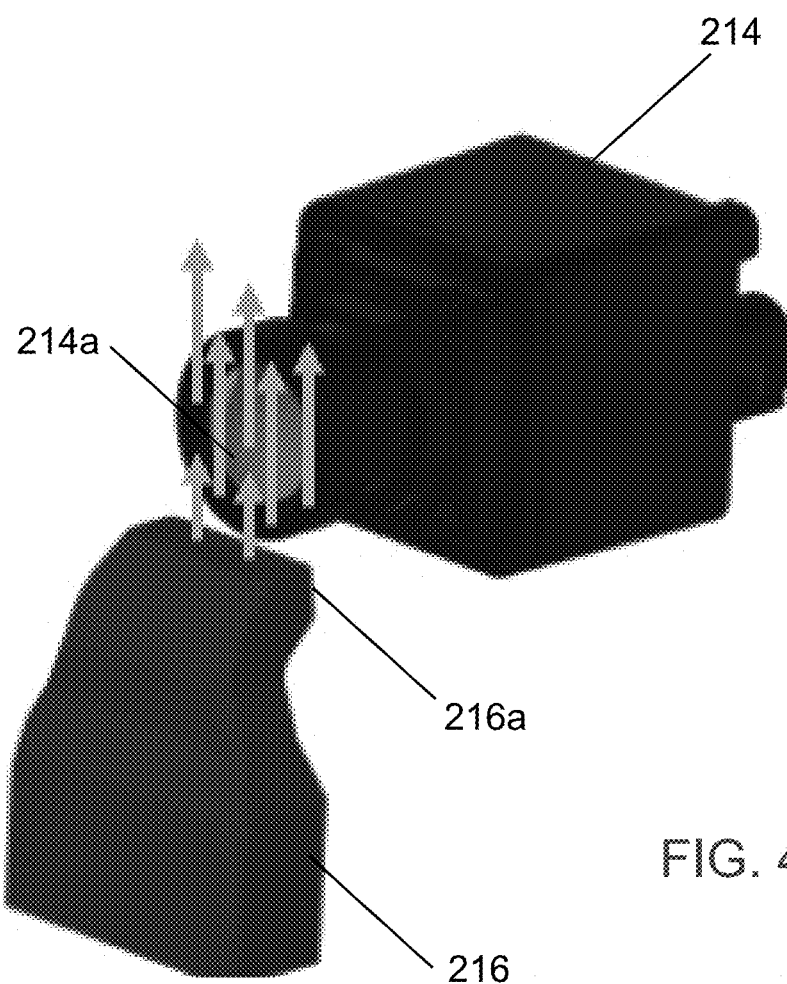

Optionally, an exterior camera 214 may have an air source 216 that is operable to direct pressurized air, such as a pressurized air jet or air knife (see FIGS. 40 and 41), across the camera lens 214*a* (or across a rotatable transparent cover as described above) to remove debris at the lens (or cover). The pressurized air is provided via a compressor, which may be located separate from the camera, such as at a remote location, whereby the compressor may be operable to provide pressurized air to multiple cameras of the vehicle, such as by utilizing aspects of the vision systems described in U.S. Pat. No. 9,707,896, which is hereby incorporated herein by reference in its entirety. As shown in FIGS. 40 and 41, the air output from the nozzle 216*a* comprises a curtain or shield of air across the cover or lens. For example, the air may be output in a direction that is perpendicular to the principal viewing axis of the camera so as to function to deflect particulates away from the lens or cover, and may be slightly angled toward the lens or cover to also function to remove particulates from the lens or cover. The air jet or air knife (such as forced or compressed air blown across the lens as a curtain of forced air) thus functions to clear the lens of particulates, and also can be used to shield the lens from particulates, so that the particulates do not reach or attach to the lens. In other words, the compressed air blowing across the lens effectively establishes a barrier that deflects particulates across the lens and away from the lens before the particulates reach the lens.

Optionally, the camera system may include additional means for cleaning the clear lens, such as a water or liquid or air or gas spraying device that is operable to spray a portion of the clear lens to enhance cleaning or clearing of dirt or contaminants at the clear lens. The lens cleaning system may utilize aspects of the systems described in U.S. Pat. Nos. 9,319,637 and/or 7,965,336, and/or U.S. Publication Nos. US-2016-0272163; US-2016-0264064; US-2014-0232869 and/or US-2014-0104426, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera module configured for mounting at an exterior portion of a vehicle, the vehicular camera module comprising:
   a housing;
   a camera disposed in the housing;
   a transparent cover rotatably mounted at the housing, the camera viewing through the transparent cover;
   an electrically powered motor that, when electrically powered, rotatably drives the transparent cover relative to the camera and the housing;
   at least one wiping element that, with the vehicular camera module mounted at the exterior portion of the vehicle, is configured to engage an exterior surface of the transparent cover as the transparent cover is rotated relative to the camera and the housing;
   a controller, wherein, with the vehicular camera module mounted at the exterior portion of the vehicle, the controller operates to move the at least one wiping element into engagement with the exterior surface of the transparent cover at least in part responsive to determination of presence of dirt or ice or debris at the transparent cover;
   wherein, with the vehicular camera module mounted at the exterior portion of the vehicle, the camera views through the transparent cover in order to capture image data of a scene exterior of the vehicle;
   wherein, with the vehicular camera module mounted at the exterior portion of the vehicle, the transparent cover rotates relative to the camera and the housing at a rotational speed of at least 1,000 rotations per minute to at least partially remove water and/or debris from an outer surface of the transparent cover; and
   wherein, with the vehicular camera module mounted at the exterior portion of the vehicle, the controller controls the electrically powered motor to rotate the transparent cover at a slower speed when the at least one wiping element is engaged with the exterior surface of the transparent cover and at a faster speed when the at least one wiping element is not engaged with the exterior surface of the transparent cover.

2. The vehicular camera module of claim 1, wherein the camera is offset from a center region of the transparent cover so as to have a principal axis of the field of view of the camera through a region of the transparent cover that is radially outboard of the center region of the transparent cover.

3. The vehicular camera module of claim 1, wherein the camera is centered at the transparent cover so as to have a principal axis of the field of view of the camera through the center of the transparent cover.

4. The vehicular camera module of claim 1, comprising a fluid spraying device that, with the vehicular camera module mounted at the exterior portion of the vehicle, outputs pressurized fluid onto the outer surface of the transparent cover.

5. The vehicular camera module of claim 1, comprising an air spraying device that, with the vehicular camera module mounted at the exterior portion of the vehicle, forces a curtain of pressurized air across the outer surface of the transparent cover, wherein the forced pressurized air functions to deflect particulates as the particulates approach the transparent cover.

6. The vehicular camera module of claim 5, wherein the forced pressurized air assists in removing water and/or debris from the outer surface of the transparent cover.

7. The vehicular camera module of claim 1, wherein, with the vehicular camera module mounted at the exterior portion of the vehicle, the vehicular camera module is part of a multi-camera vision system of the vehicle.

8. The vehicular camera module of claim 7, wherein, with the vehicular camera module mounted at the exterior portion of the vehicle, the vehicular camera module of the multi-camera vision system captures image data for display of a surround view of the vehicle for viewing by a driver of the vehicle.

9. A vehicular camera module configured for mounting at an exterior portion of a vehicle, the vehicular camera module comprising:
   a housing;
   a camera disposed in the housing;
   a transparent cover rotatably mounted at the housing, the camera viewing through the transparent cover;
   a wiping element that is configured to engage an exterior surface of the transparent cover to wipe the transparent cover as the transparent cover is rotated relative to the camera and the housing;
   a controller operable to control rotation of the transparent cover relative to the camera and the housing;
   a fluid spraying device operable to spray fluid at least across the transparent cover;
   wherein, with the vehicular camera module mounted at the exterior portion of the vehicle, the camera views through the transparent cover in order to capture image data of a scene exterior of the vehicle;
   wherein the camera is offset from a center region of the transparent cover so as to have a principal axis of the field of view of the camera through a region of the transparent cover that is radially outboard of the center region of the transparent cover;
   wherein, with the vehicular camera module mounted at the exterior portion of the vehicle, the transparent cover rotates relative to the camera and the housing at a rotational speed of at least 1,000 rotations per minute to at least partially remove water and/or debris from an outer surface of the transparent cover;
   wherein, with the vehicular camera module mounted at the exterior portion of the vehicle, and with the fluid spraying device spraying fluid at least across the transparent cover, the sprayed fluid assists in removing water and/or debris from the outer surface of the transparent cover; and
   wherein, with the vehicular camera module mounted at the exterior portion of the vehicle, the controller rotates the transparent cover at a slower rotational speed when the wiping element is engaged with the exterior surface of the transparent cover and at a faster rotational speed when the wiping element is not engaged with the exterior surface of the transparent cover, and wherein the faster rotational speed is at least 1,000 rotations per minute.

10. The vehicular camera module of claim 9, wherein fluid output by the fluid spraying device is used to power a fluid driven motor that rotatably drives the transparent cover relative to the camera and the housing.

11. The vehicular camera module of claim 9, wherein, with the vehicular camera module mounted at the exterior portion of the vehicle, and with the fluid spraying device spraying fluid at least across the transparent cover, the sprayed fluid establishes a curtain of fluid across the outer surface of the transparent cover, and wherein the curtain of fluid deflects particulates as the particulates approach the transparent cover.

12. The vehicular camera module of claim 11, wherein the sprayed fluid comprises pressurized air, and wherein the fluid spraying device comprises a nozzle that outputs pressurized air in a direction transverse to the principal axis of the field of view of the camera.

13. A vehicular camera module configured for mounting at an exterior portion of a vehicle, the vehicular camera module comprising:
   a housing;
   a camera disposed in the housing;
   a transparent cover rotatably mounted at the housing, the camera viewing through the transparent cover;
   a wiping element that is configured to engage an exterior surface of the transparent cover to wipe the transparent cover as the transparent cover is rotated relative to the camera and the housing;
   a controller operable to control rotation of the transparent cover relative to the camera and the housing;
   wherein, with the vehicular camera module mounted at the exterior portion of the vehicle, the camera views through the transparent cover in order to capture image data of a scene exterior of the vehicle;
   wherein, with the vehicular camera module mounted at the exterior portion of the vehicle, the transparent cover is rotatable relative to the camera and the housing at a rotational speed of at least 1,000 rotations per minute to at least partially remove water and/or debris from an outer surface of the transparent cover;
   wherein, with the vehicular camera module mounted at the exterior portion of the vehicle, the controller operates to rotate the transparent cover relative to the camera and the housing at the rotational speed of at least 1,000 rotations per minute at least in part responsive to a trigger;
   wherein, at least in part responsive to determination of presence of dirt or ice or debris at the transparent cover, the controller operates to move the wiping element into engagement with the exterior surface of the transparent cover; and
   wherein, with the vehicular camera module mounted at the exterior portion of the vehicle, the controller rotates the transparent cover at a slower rotational speed when the wiping element is engaged with the exterior surface of the transparent cover and at a faster rotational speed when the wiping element is not engaged with the exterior surface of the transparent cover, and wherein the faster rotational speed is at least 1,000 rotations per minute.

14. The vehicular camera module of claim 13, wherein the trigger comprises determination, via processing of image data captured by the camera, of presence of dirt or ice or debris at the transparent cover.

15. The vehicular camera module of claim 13, wherein vehicular camera module comprises a rear backup camera of a vehicle, and wherein the trigger comprises shifting of the vehicle transmission into reverse gear.

16. The vehicular camera module of claim 13, wherein the controller rotates the transparent cover by applying a higher torque when rotating the transparent cover at the slower rotational speed as compared to the torque applied when rotating the transparent cover at the faster rotational speed.

* * * * *